US006711286B1

(12) United States Patent
Chen et al.

(10) Patent No.: US 6,711,286 B1
(45) Date of Patent: Mar. 23, 2004

(54) METHOD FOR BLOND-HAIR-PIXEL REMOVAL IN IMAGE SKIN-COLOR DETECTION

(75) Inventors: Shoupu Chen, Rochester, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 649 days.

(21) Appl. No.: 09/692,929

(22) Filed: Oct. 20, 2000

(51) Int. Cl.[7] .............................. G06K 9/00; G06K 9/40; G03F 3/08
(52) U.S. Cl. ....................... 382/162; 382/167; 382/275; 358/515; 358/518; 358/520; 358/523
(58) Field of Search ................................. 382/117, 118, 382/162, 164, 165, 167, 224, 228, 270, 272, 276, 282, 283, 290, 291, 275, 295; 358/505, 515, 518, 523, 530, 520, 462

(56) References Cited

U.S. PATENT DOCUMENTS

| | | | | |
|---|---|---|---|---|
| 3,778,541 A | * | 12/1973 | Bowker | 358/505 |
| 5,128,711 A | | 7/1992 | Terashita et al. | 355/41 |
| 5,748,764 A | | 5/1998 | Benati et al. | 382/117 |
| 5,850,463 A | * | 12/1998 | Horii | 382/118 |
| 5,907,315 A | * | 5/1999 | Vlahos et al. | 382/167 |
| 5,940,530 A | * | 8/1999 | Fukushima et al. | 382/164 |
| 6,072,526 A | * | 6/2000 | Hashimoto et al. | 348/223.1 |
| 6,249,317 B1 | * | 6/2001 | Hashimoto et al. | 348/364 |
| 6,292,574 B1 | * | 9/2001 | Schildkraut et al. | 382/117 |
| 6,343,141 B1 | * | 1/2002 | Okada et al. | 382/118 |
| 6,611,613 B1 | * | 8/2003 | Kang et al. | 382/118 |

OTHER PUBLICATIONS

U.S.patent application Ser. No. 08/919,560, Schildraut et al., filed Aug. 29, 1997.

"Face Detection from Color Images Using a Fuzzy Pattern Matching Method" Haiyuan Wu, Qian Chen, and Masahiko Yachida. IEEE Transactions on Pattern Analysis and Machine Intelligence, vol. 21, No. 6, Jun. 1999, pp. 557–563.

* cited by examiner

*Primary Examiner*—Andrew W. Johns
*Assistant Examiner*—Amir Alavi
(74) *Attorney, Agent, or Firm*—David M. Woods

(57) ABSTRACT

A computer vision/image processing method of removing blond hair color pixels in digital image skin detection for a variety of imaging related applications, such as redeye defects detection, employs a combination of skin detectors operating in a generalized RGB space in combination with a hue space derived from the original image space to detect skin pixels and blond hair pixels within the skin pixels.

15 Claims, 3 Drawing Sheets

METHOD FOR BLOND-HAIR-PIXEL REMOVAL IN IMAGE SKIN-COLOR DETECTION

FIELD OF THE INVENTION

The current invention relates to the field of digital detection for skin color pixels in a digital image, and in particular to the field of hair-skin color pixel separation in a digital image.

BACKGROUND OF THE INVENTION

Skin color detection is adopted as a preliminary step in automatic redeye detection and correction of consumer images for real-time use (see commonly assigned U.S. Ser. No. 08/919,560 filed Aug. 29, 1997 entitled "A Computer Program Product for Redeye Detection"). In this redeye detection application, skin color areas are first located and subsequent steps are employed to determine if the red dots within the skin color areas are true red eyes. The success of redeye detection largely depends on the success of having clean face skin color regions identified. Previous experiences tell that it is particularly difficult to obtain clean face regions in color images with the presence of blond hairs.

The algorithm designed in the aforementioned redeye detection application is used for locating and correcting redeye defects in consumer images without user intervention such as ROI (region-of-interest) selection. The major goal of the redeye detection algorithm is to detect redeye defects with a minimum number of false positives and within a minimum execution time without sacrificing performance. For this reason, face-region (with most of the hair regions eliminated) detection is performed so that unnecessary processing is not performed on red-dot candidates that are not located in detected face regions. The easiest and fastest way for face-region localization is the use of skin-color pixel detection that requires only pixel operations. It has been shown that difficulties arise when dealing with images having faces associated with blond hairs. In these cases, the skin-color detection process fails to produce satisfactory or desired results that would assist in the redeye detection procedure. FIG. 1 displays an example picture 500 that causes problems. In FIG. 1, objects 504, 505, 508, 509, and 510 are non-skin objects; 501 and 506 are blond hairs; 502, 503, and 507 are skin regions. In FIG. 2, picture 600 shows the example result of conventional skin detection algorithms. Clearly, the skin-color detection process does not separate the hairs from the face (see object 601) and therefore the subsequent redeye detection process will take the whole head plus the body as the face region and no redeye defects will be corrected.

There have been many publications recently addressing skin color detection for face recognition in color image processing, but only a few of them concern the issue of hair-face skin pixel identification. For instance, in Wu et al. (H. Wu, Q. Chen, and M. Yachida, "Face Detection From Color Images Using a Fuzzy Pattern Matching Method," IEEE Transactions on Pattern Analysis and Machine Intelligence, Vol. 21, No. 6, pp. 557–563, 1999), a hair model is used to assist face detection. The RGB color information in an image is first converted to CIE's XYZ color representation through a linear transformation resulting in one luminance component Y and two chromaticity components $x=X/(X+Y+Z)$ and $y=Y/(X+Y+Z)$. Then the two chromaticity components, x and y, are furthered converted to another space through a non-linear transformation, resulting in two new color components, u and v, that are perceptually uniformly-distributed in the new color space. The hair model is a function of three variables: the luminance Y and the chromaticities, u and v. Noticeably, this hair model works mainly for Asian faces with dark hairs. Moreover, the conversion from RGB to the corresponding CIE tristimulus values requires the knowledge of the color calibration that varies from imaging device to device.

There are a number of color spaces currently used by researchers for color image processing as described below.

Psychological space—Some researchers believe that the RGB basis is not a particularly good one to explain the perception of colors. Alternatively, a transformed non-RGB space, or a psychological space, is well accepted to describe 'colors'. It is compatible to human color perception. This non-RGB space is composed of three components, hue (H), saturation (S) and brightness value (V). Instead of using three values (R,G,B) to distinguish color objects, a single component, H, is used to label a color pixel in this transformed space.

CIELab space-CIE in 1976 recommended the CIELab formula for color measurement. It is designed that colors in the CIELab space are perceptually more uniformly spread than are colors in RGB and psychological (e.g. HSV) spaces. Therefore, using the CIELab space enables the use of a fixed color distance in decision making over a wide range of colors.

Lst space—The Lst space is traditionally called T-space in graphic applications and is constructed with log exposures. L is the luminance component, and s and t are the two chrominance components. It is shown that the statistical distribution of color signals is more symmetrical in Lst space than in linear space.

$YC_RC_B$ space—The $YC_RC_B$ space is designed for television broadcasting signal conversion. Y is the luminance component, $C_R$ and $C_B$ are two chrominance components. Researchers working in video images prefer using this space.

Generalized R-G-B Space (gRGB)—This is also called normalized R-G-B space. This space is transformed from the native R-G-B space by normalizing each of the three elements of the original R-G-B by the summation of the three original elements. The resultant three new elements are linearly dependent so that only two elements are needed to effectively form a new space that is collapsed from three dimensions to two dimensions. So, it is also called a collapsed R-G-B space in some articles. This space does not provide an explicit luminance component like the other spaces. This generalization process reduces the illuminant effects on chromaticity components.

So far, there are no conclusive data showing that any one of the above color spaces is overwhelmingly superior to any others in terms of skin-color detection performance. The skin-color detector performance, rather, mostly depends on the structure of the detector itself. The reality is that space transformation from RGB to another color domain does not change the skin-pixel and non-skin-pixel distribution overlap in the original RGB space. This skin-pixel and non-skin-pixel distribution overlap is the major cause of FP (false positive) in skin-color detection. The selection of color space largely depends on designers' preference, practical use effectiveness, and model complexity.

TABLE 1

Space transformation computation complexity (pixel-wise)

|  | HSV | Lab | Lst | YC_RC_B | gRGB |
|---|---|---|---|---|---|
| Addition | 3.17 | 9 | 5 | 9 | 2 |
| Multiplication | 1.5 | 32 | 4 | 9 | 2 |
| Logical Operation | 5 |  |  |  | 1 |

Note: for HSV, only H is considered; gRGB stands for generalized RGB

Table 1 illustrates the computation expense for different transformation operations. Among them, gRGB transformation has the lowest computation expense. This is one of the advantages that gRGB transformation provides.

What is therefore needed is a way to provide an efficient skin-color detection method with which desirable clean face regions can be obtained with very low computation complexity prior to further image processing for applications such as the aforementioned redeye detection in the presence of blond hairs. The present invention describes a mechanism that overcomes the difficulty of separating blond hair pixels from skin color pixels by fusing two color detection strategies that work in generalized RGB (gRGB) space and the hue space respectively.

SUMMARY OF THE INVENTION

It is an objective of the present invention to automatically detect the skin color region in a digital color image.

It is a further object of the present invention to produce a clean skin color image in the presence of blond hairs.

The present invention is directed to overcoming one or more of the problems set forth above. Briefly summarized, according to one aspect of the present invention, a method and a computer program product for generating a clean skin color image comprises the steps of:

(a) converting an input RGB color image from the native RGB space to a preferred color space, the generalized RGB (gRGB) space, resulting in a GRGB color image;

(b) selecting two of the generalized RGB color components (generalized R and G in this case) to form a working space for skin color detection;

(c) classifying the pixels of the converted input image, the gRGB color image, into skin color and non-skin color pixels;

(d) eliminating non-skin color pixels and forming a binary skin color mask;

(e) masking the gRGB color image obtained in step (a) to form a masked gRGB image;

(f) converting the masked gRGB image to a hue image;

(g) separating blond hair color pixels and the skin color pixels in the hue space using the hue image;

(h) removing the blond hair color pixels in the hue image and forming a new skin color binary mask;

(i) masking the original RGB color image to form a masked color image that retains skin color pixels only.

These and other aspects, objects, features and advantages of the present invention will be more clearly understood and appreciated from a review of the following detailed description of the preferred embodiments and appended claims, and by reference to the accompanying drawings.

Advantageous Effect of the Invention

The present invention is effective in obtaining a clean skin color image in the presence of blond hair color pixels and has the advantages of:

(1) performing skin detection in the dimension-reduced space;

(2) conducting skin detection recfinement in one-dimension space;

(3) fusing two color classification strategies performed in two stages (skin detection and skin detection refinement);

(4) effectively using intermediate results of the first stage in the second stage;

(5) providing imaging applications such as redeye detection with cleaner skin color images.

DETAILED DESCRIPTION OF THE INVENTION

In the following description, a preferred embodiment of the present invention will typically be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the method as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 3:
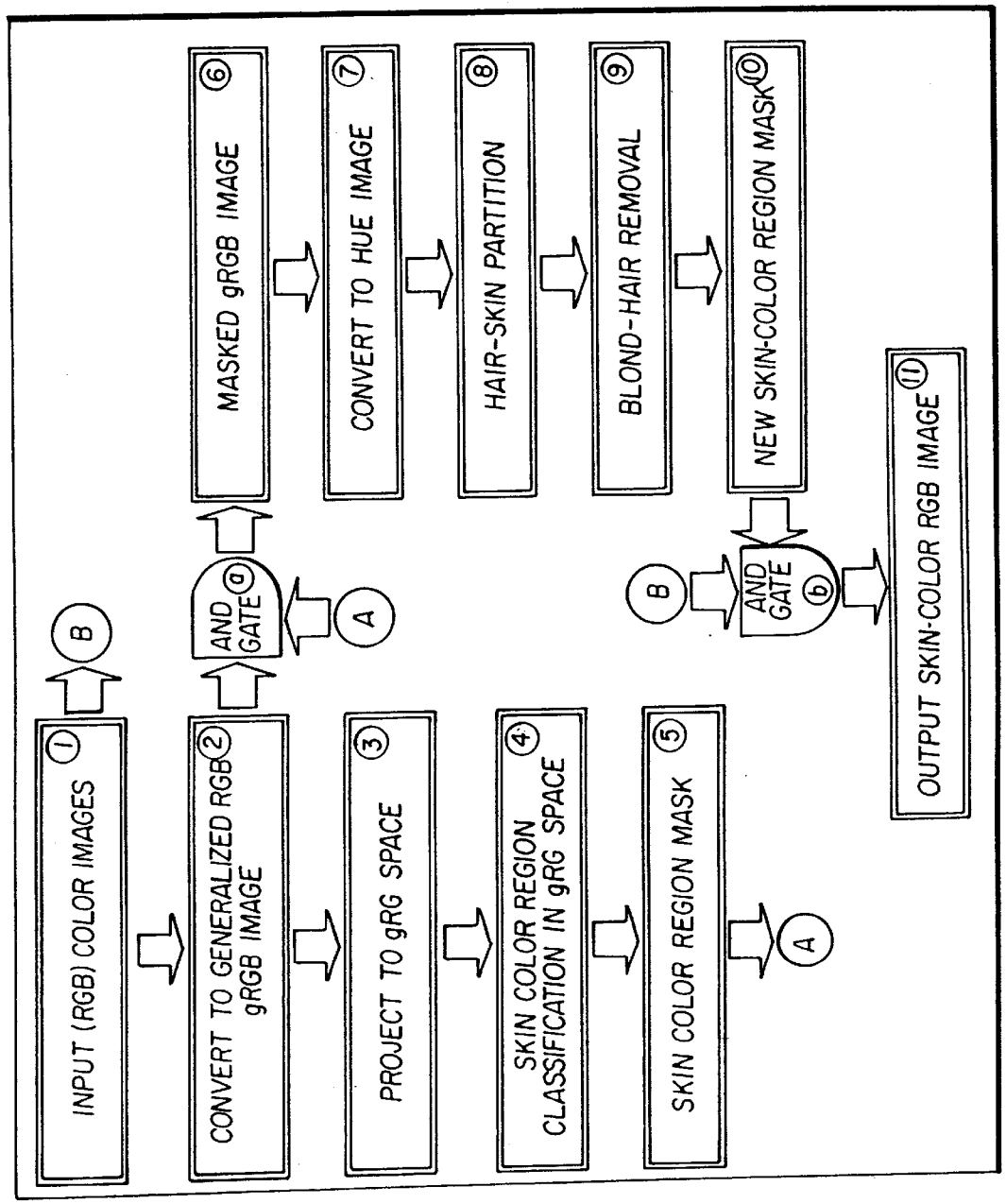
FIG. 3 is the flow chart of the steps which are performed to effect formation of a clean skin color image in the presence of blond hairs in accordance with a preferred method of the present invention.

Referring now to FIG. 3, block 1 represents the input (RGB) color image to be processed. For speedy processing, the input image is re-sampled to a default size of 252 by 320 if the input image size exceeds the default size. A simple pixel-averaging process is performed during the re-sampling procedure.

In block 2, the input RGB image, $I_{RGB}$ with size of M×N×3, is converted to the generalized RGB image, $I_{gRGB}$, using the formula:

$$c_j(m, n) = \frac{C_j(m, n)}{\sum_i C_i(m, n)} \mid j \in i = [1, 2, 3]; \quad (1)$$

$$m = [0, \ldots M-1]; \quad n = [0, \ldots N-1]$$

where $C_i$ is the individual color channel (R, G, or B) of the input image $I_{RGB}$, $c_j$ is the individual color channel of the resultant generalized R, G or B of the output image $I_{gRGB}$. This operation is not valid when $$\sum_i C_i = 0,$$

and the output will be set to zero. The resultant three new elements are linearly dependent, that is, $$\sum_j c_j = 1,$$

so that only two elements are needed to effectively form a new space that is collapsed from three dimensions to two dimensions. In most cases, as represented in block 3, $c_1$ and $c_2$, that is, generalized R and G, are used in analyzing the skin color distribution of a large population of images and detecting skin color pixels in an image. Although only $c_1$ and $c_2$ need to be computed at this point, however, in this design, $C_3$ is also computed since all of them are needed in a later stage, hue computation.

Figure 4:
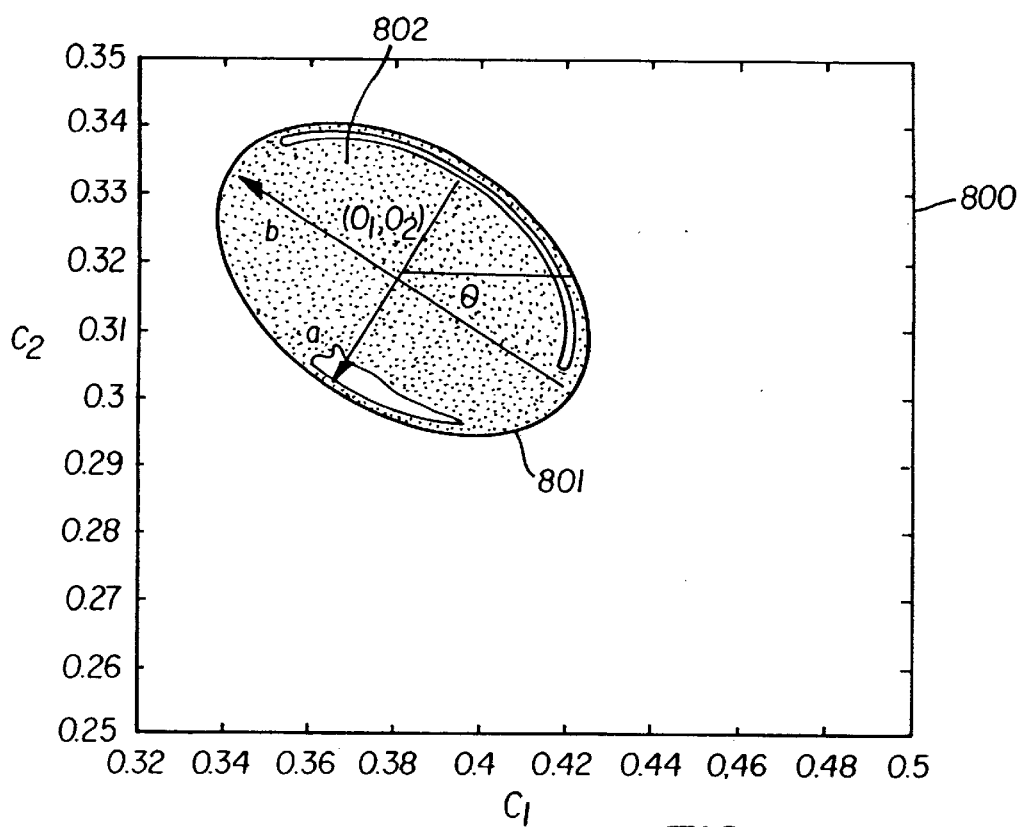
FIG. 4 is a pictorial view illustrating a normal skin color distribution in the generalized RG space and an ellipse classifier and its parameters used in this invention.

The skin-color region detection takes place in block 4. The generalized RGB image $I_{gRGB}$ is passed to a classifier that is trained on a large population of images beforehand. $c_1$ and $c_2$ of the image $I_{gRGB}$ are used in the classification process. Referring to FIG. 4, the pictorial view 800 presents an example where dark region 802 contains skin-color pixels in the $(c_1, c_2)$ space. The classifier is an ellipse 801 in the $(c_1, c_2)$ space. Parameters a, b, $(o_1, o_2)$, and θ are the constants of the trained classifier, where a and b are the ellipse axes length, $(o_1, o_2)$ is the center coordinates of the ellipse in the $(c_1, c_2)$ space, and θ is the angle between the $c_1$ axis and the longer axis of the ellipse. Exemplary parameter values for the ellipse are:

a=0.0223;

b=0.0443;

$o_1$=0.3872;

$o_2$=0.3180;

θ=−0.4323.  (2)

The resultant of the skin-color classifier is a skin-color mask (block 5) $P_{skin}=\{p(i, j)\}_{M \times N}$, that is, an M×N matrix with elements $p(i, j)$. For each pixel of the generalized RGB image $I_{gRGB}$, define an evaluation function $E(c_1(i,j), c_2(i,j))$, where i=0, . . . M−1; j=0, . . . N−1, $c_1(i, j) \in [0,1]$; $c_2(i, j) \in [0,1]$. The classification is simply performed as:

$$p(i, j) = \begin{cases} 1 & \text{if } E(c_1, (i, j), c_2(i, j)) < 1 \\ 0 & \text{else} \end{cases} \quad (3)$$

where "1" indicates a skin-color pixel and "0" for non-skin color, and $$E(c_1(i, j), c_2(i, j)) = x_{ij}^2/a^2 + y_{ij}^2/b^2 \quad (4)$$

and $$x_{ij} = (c_1(i, j) - o_1)\cos(\theta - \pi/4) - (c_2(i, j) - o_2)\sin(\theta - \pi/4)$$

$$y_{ij} = (c_1(i, j) - o_1)\sin(\theta - \pi/4) - (c_2(i, j) - o_2)\cos(\theta - \pi/4) \quad (5)$$

In FIG. 3, the skin-color mask, $P_{skin}$, is provided to terminal A, where it then becomes an input to AND gate a. The other input of AND gate a is the generalized RGB image $I_{gRGB}$. The output of gate a is the masked generalized RGB image (block 6) $\hat{I}_{gRGB} = I_{gRGB} \cap P_{skin}$.

Figure 5:
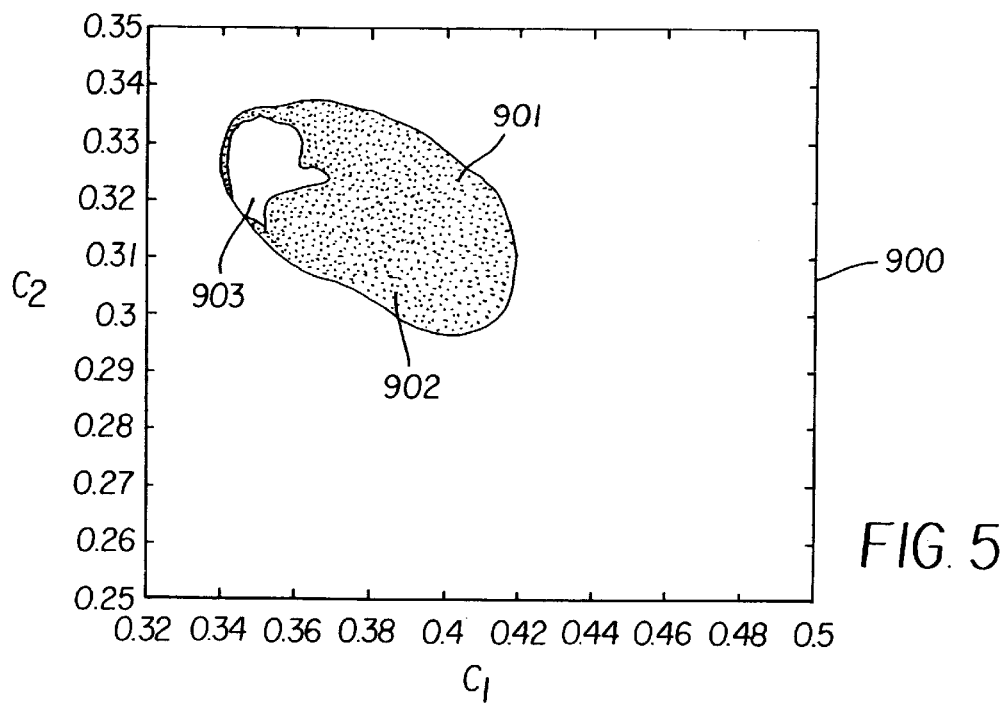
FIG. 5 is a pictorial view illustrating the blond hair and associated skin color distribution in the generalized RG space shown in FIG. 4.
Figure 6:
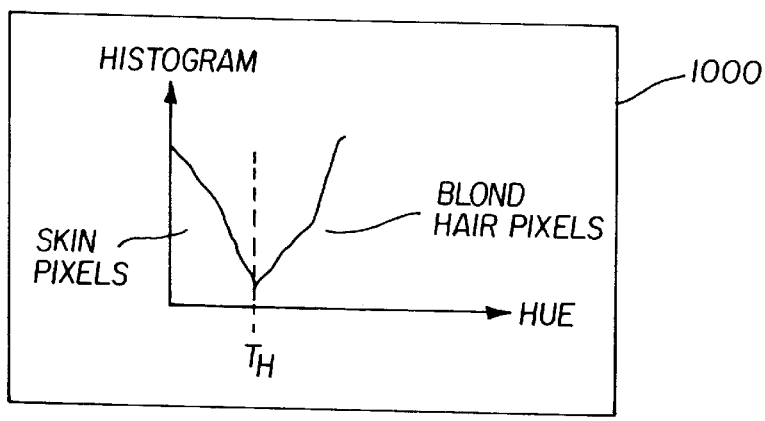
FIG. 6 is an illustration of a histogram of blond hair and associated skin color in the hue space.

As was revealed in the study, the blond hair color distributes in the same region where the majority skin color occupies, as shown by the pictorial view 900 in FIG. 5. The blond hair color pixels are plotted in a region 903, skin color pixels in a region 902 for a person with blond hair, and a region 901 is for a larger population of skin color pixels. It is not a trivial task to parameterize the sub-regions in the $(c_1, c_2)$ space so that the region 903 can be separated from the region 902. If the space dimension drops down to one, the separation of blond hair color pixels from the skin color pixels becomes fairly easy. This further reduction of dimension size is realized in block 7 where the masked generalized RGB image $\hat{I}_{gRGB}$ is converted to a hue image H={h(m, n)}$_{M \times N}$. A typical hue conversion is performed as:

$$\text{if } \left(c_{\min} = \min_{i \in [1,2,3]}(c_i(m, n))\right) \neq \left(c_{\max} = \max_{i \in [1,2,3]}(c_i(m, n))\right) \text{ do} \quad (6)$$

if $c_1(m, n) = c_{\max}$ do $h(m, n) = (c_2(m, n) - c_3(m, n))/(c_{\max} - c_{\min})$ elseif $c_2(m, n) =$ $c_{\max}$ do $h(m, n) = 2 + (c_3(m, n) - c_1(m, n))/(c_{\max} - c_{\min})$ elseif $c_3(m, n) = c_{\max}$ do $h(m, n) =$ $4 + (c_1(m, n) - c_2(m, n))/(c_{\max} - c_{\min}); h(m, n) = h(m, n) * 60°;$ if $h(m, n) < 0.0$ do $h(m, n) = h(m, n) + 360°;$ The separation of hair and skin and hair removal is conducted in blocks 8 and 9. Referring to the pictorial view 1000 in FIG. 6, a histogram of blond hair pixels and its associated skin pixels provides useful information for partitioning the blond hair color and the skin color in the hue space. A measured partition parameter $T_H$ is used to determine if an element h(m, n) is a skin pixel or a blond hair pixel:

$$\tilde{p}(m, n) = \begin{cases} 1 & \text{if } h(m, n) < T_H \\ 0 & \text{else} \end{cases} \quad (7)$$

Figure 1:
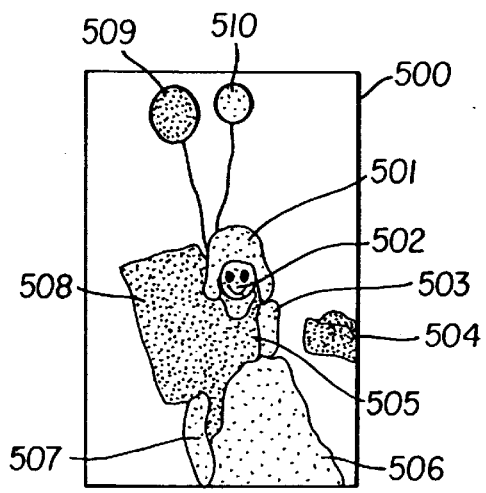
FIG. 1 is a pictorial view of a human face with blond hair and other body parts and other non-skin color objects.
Figure 2:
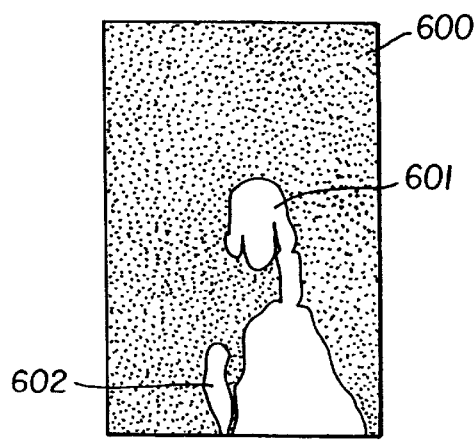
FIG. 2 is a pictorial view of the skin detection results of objects in FIG. 1 using traditional skin detectors.
Figure 7:
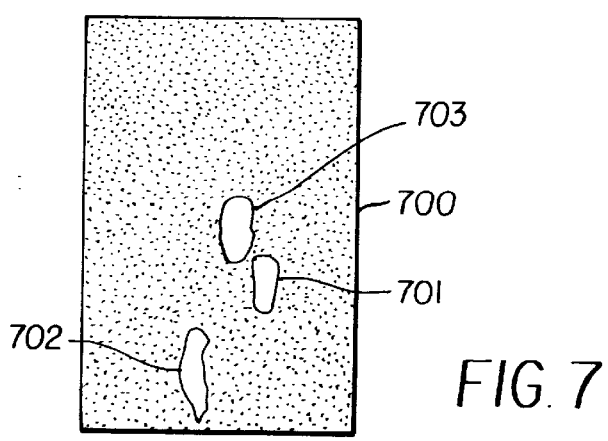
FIG. 7 is a pictorial view of the skin detection results of objects in FIG. 1 using the present invention.

As shown in Equation (7), a new mask (block 10), $\tilde{P}_{skin} = \{\tilde{p}(i, j)\}_{M \times N}$, is formed; if h(m, n) is a skin pixel, then the corresponding element $\tilde{p}(m, n)=1$, else $\tilde{p}(m, n)=0$. In the preferred embodiment, the measured partition parameter $T_H=15$. The output skin-color RGB image $\hat{I}_{RGB}$ (block 11) is the result of an AND operation (in gate b) of the new skin mask $\tilde{P}_{skin}$ and the original RGB color image $I_{RGB}$ input through terminal B. In FIG. 7, the pictorial view 700 displays an exemplary skin mask $\tilde{P}_{skin}$ for the example image shown in FIG. 1. A clean face part 701 is separated from other body parts 702 and 703, and therefore, provides useful information for applications such as redeye detection.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The invention has been described with reference to a preferred embodiment. However, it will be appreciated that variations and modifications can be effected by a person of ordinary skill in the art without departing from the scope of the invention.

PARTS LIST

0 detection phase
a block
b block
1 block
2 block
3 block
4 block
5 block
6 block
7 block
8 block
9 block
10 block
11 block
501 blind hair
502 face
503 body part
504 non-skin object
505 non-skin object
506 blond hair
507 body part
508 non-skin object
509 non-skin object
510 non-skin object
601 non-skin part
602 skin part
701 skin part
702 skin part
703 skin part
801 ellipse classifier
802 skin color pixels
901 skin color pixels
902 skin color pixels
903 blond hair pixels
1000 histogram

What is claimed is:

1. A method for removing blond hair color pixels during skin color detection in a digital RGB image, the method comprising the steps of:
   (a) converting the image from an RGB space to a generalized RGB space, thereby obtaining a gRGB image;
   (b) detecting skin color pixels within the GRGB image;
   (c) forming a first skin color image mask based on the detected skin color pixels;
   (d) generating a masked GRGB image using the first skin color image mask;
   (e) converting the masked gRGB image to a hue image;
   (f) separating blond hair color and the associated skin color within the hue image;
   (g) forming a second skin color image mask based on the separated skin color pixels in the hue image; and
   (h) generating a masked RGB image using the second skin color image mask.

2. A method as claimed in claim 1 wherein the step (b) of detecting skin color pixels within the gRGB image employs an ellipse classifier.

3. A method as claimed in claim 2 wherein the ellipse classifier classifies skin color pixels and non-skin color pixels in the generalized RG space.

4. A method as claimed in claim 3 wherein the ellipse classification comprises the steps of:
   (a) calculating a value for each of the pixels using the generalized R and G components;
   (b) performing the calculation in step (a) using ellipse parameters, and
   (c) classifying skin color pixels or non-skin color pixels based on the value calculated in step (a).

5. A method as claimed in claim 1, wherein the conversion in step (e) is performed on the masked gRGB image.

6. A method as claimed in claim 1, wherein the separation of blond hair color pixel and the associated skin color pixel in step (f) is performed in one dimensional hue space.

7. A method as claimed in claim 6, wherein the separation of blond hair color pixel and the associated skin color pixel in step (f) is performed by means of a histogram metric in one dimensional hue space.

8. A computer program product employing the method claimed in claim 1.

9. A method for removing blond hair color pixels during skin color detection in an original digital image space, the method comprising the steps of:
   (a) converting the original digital image space to a normalized space, thereby obtaining a normalized image;
   (b) detecting skin color pixels within the normalized image;
   (c) generating a masked normalized image using the detected skin color pixels;
   (d) converting the masked normalized image to a one-dimensional image space;
   (e) separating blond hair color and the associated skin color within the one-dimensional image space; and
   (f) utilizing the separated pixels in the one-dimensional space to identify blond hair color pixels in the original image space.

10. The method as claimed in claim 9 wherein step (f) comprises the steps of:
    (f1) forming a skin color image mask based on the separated skin color pixels in the one-dimensional image space; and
    (f2) generating a masked image in the original image space using the skin color image mask.

11. The method as claimed in claim 9 wherein the one-dimensional image space is a hue image.

12. The method as claimed in claim 9 wherein the original digital image space is an RGB space.

13. The method as claimed in claim 12 wherein the normalized space is a generalized RGB space.

14. A computer program product employing the method claimed in claim 9.

15. A system for detecting blond hair color pixels in an original digital image space, said system comprising a combination of skin detectors operating in a generalized RGB image space and a in sole combination with a one-dimensional hue image space derived from the original image space to detect skin pixels and blond hair pixels within the skin pixels.

* * * * *